(12) United States Patent
Transier et al.

(10) Patent No.: US 8,498,972 B2
(45) Date of Patent: *Jul. 30, 2013

(54) STRING AND SUB-STRING SEARCHING USING INVERTED INDEXES

(75) Inventors: Frederik Transier, Heidelberg (DE); Franz Faerber, Heidelberg (DE)

(73) Assignee: SAP AG, Walldorf (DE)

( * ) Notice: Subject to any disclaimer, the term of this patent is extended or adjusted under 35 U.S.C. 154(b) by 274 days.

This patent is subject to a terminal disclaimer.

(21) Appl. No.: 12/970,780

(22) Filed: Dec. 16, 2010

(65) Prior Publication Data

US 2012/0158782 A1    Jun. 21, 2012

(51) Int. Cl.
    *G06F 17/30*      (2006.01)

(52) U.S. Cl.
USPC ........... 707/696; 707/739; 707/740; 707/741; 707/742; 707/743; 707/744; 707/745; 707/746; 707/715; 707/706; 704/7; 704/8; 704/9

(58) Field of Classification Search
USPC ... 707/739–746, 711, 715, 696, 706; 704/7–9
See application file for complete search history.

(56) References Cited

U.S. PATENT DOCUMENTS

| | | | |
|---|---|---|---|
| 5,715,195 A | 2/1998 | Smayling et al. | |
| 6,131,082 A | 10/2000 | Hargrave, III et al. | |
| 6,389,387 B1 * | 5/2002 | Poznanski et al. | 704/9 |
| 6,466,901 B1 * | 10/2002 | Loofbourrow et al. | 704/9 |
| 6,482,011 B1 * | 11/2002 | Lee et al. | 434/157 |
| 6,532,492 B1 | 3/2003 | Presler-Marshall | |
| 6,901,361 B1 * | 5/2005 | Portilla | 704/8 |
| 6,952,691 B2 * | 10/2005 | Drissi et al. | 1/1 |
| 7,039,625 B2 * | 5/2006 | Kim et al. | 707/706 |
| 7,194,406 B2 * | 3/2007 | Ejerhed et al. | 704/9 |
| 7,206,934 B2 * | 4/2007 | Pabla et al. | 713/168 |
| 7,260,570 B2 * | 8/2007 | Brown et al. | 1/1 |
| 7,657,597 B2 * | 2/2010 | Arora et al. | 709/206 |
| 7,672,831 B2 * | 3/2010 | Todhunter et al. | 704/4 |
| 8,135,580 B1 * | 3/2012 | Jin et al. | 704/9 |
| 8,171,029 B2 * | 5/2012 | Marvit et al. | 707/740 |
| 8,175,875 B1 * | 5/2012 | Dean et al. | 704/245 |
| 8,204,992 B2 * | 6/2012 | Arora et al. | 709/226 |
| 8,244,530 B2 * | 8/2012 | Dean et al. | 704/245 |
| 2003/0149686 A1 * | 8/2003 | Drissi et al. | 707/3 |
| 2004/0064512 A1 * | 4/2004 | Arora et al. | 709/206 |
| 2004/0064568 A1 * | 4/2004 | Arora et al. | 709/228 |
| 2004/0064693 A1 * | 4/2004 | Pabla et al. | 713/168 |
| 2004/0078190 A1 * | 4/2004 | Fass et al. | 704/7 |
| 2004/0117366 A1 * | 6/2004 | Ferrari et al. | 707/5 |
| 2005/0038781 A1 * | 2/2005 | Ferrari et al. | 707/4 |
| 2007/0050384 A1 * | 3/2007 | Whang et al. | 707/100 |
| 2007/0156669 A1 * | 7/2007 | Marchisio et al. | 707/4 |
| 2008/0126335 A1 | 5/2008 | Gandhi et al. | |
| 2008/0275691 A1 * | 11/2008 | Summerlin et al. | 704/8 |
| 2008/0288474 A1 * | 11/2008 | Chin et al. | 707/4 |
| 2009/0089256 A1 | 4/2009 | Transier et al. | |
| 2012/0023073 A1 * | 1/2012 | Dean et al. | 707/693 |
| 2012/0158782 A1 * | 6/2012 | Transier et al. | 707/771 |

OTHER PUBLICATIONS

U.S. Appl. No. 12/970,766, Frederik Transier, et al.

* cited by examiner

*Primary Examiner* — Frantz Coby
(74) *Attorney, Agent, or Firm* — Mintz, Levin, Cohn, Ferris, Glovsky and Popeo, P.C.

(57) ABSTRACT

Inverted indexes for terms and for term separators are separately provided to minimize data redundancy. Search queries are parsed to identify terms and term separators, if any, and the corresponding inverted indexes are searched for responsive documents. Related apparatus, systems, techniques and articles are also described.

18 Claims, 3 Drawing Sheets

STRING AND SUB-STRING SEARCHING USING INVERTED INDEXES

TECHNICAL FIELD

The subject matter described herein relates to techniques, systems, and articles for string and sub-string searching using inverted indexes.

BACKGROUND

Classical database systems store textual content in simple string columns. With such arrangements, searching can only be performed for sequences of characters and speed of execution is moderate. For the most state-of-the-art databases, it is also possible to create additional full-text indexes on string columns. That is, the text is split into words, and a positional inverted index is created on these words. Using the index, it is possible to search for phrases (sequences of words), and it is also possible to answer Boolean queries on a word level. However, this approach has two major drawbacks. First, large parts of the data must be stored twice (as string data and within the inverted index). Second, searching for substrings (sequences of characters) is comparatively slow because such searching is performed on raw data.

SUMMARY

In one aspect, a search query of a collection of electronic documents is parsed to identify one or more terms and/or one or more term separators. Thereafter, at least one terms inverted list corresponding to at least one identified term is retrieved from a terms positional inverted index (if present in the query). The terms positional inverted index comprises a first plurality of inverted lists mapping exact representations of terms to documents and associated document positions within the collection of electronic documents. In addition, at least one separators inverted list corresponding to at least one identified separator is retrieved from a separators positional inverted index (if present in the query). The separators positional inverted index comprises a second plurality of inverted lists mapping term separators to documents and associated document positions within the collection of electronic documents. Further, the separators position inverted index is separate and distinct from the terms positional inverted index. Documents common to the retrieved at least one terms inverted list and to the retrieved at least one separators inverted list are then identified so that provision of data characterizing the identified documents can be initiated.

The provision of data can include one or more of: transmitting at least a portion of the data characterizing the identified documents (e.g., data identifying a location of the identified documents, etc.), persisting at least a portion of the data characterizing the identified documents, and/or displaying at least a portion of the data characterizing the identified documents.

The term separators can be one or more of: periods, spaces, commas, colons, semi-colons and exclamation points.

The first plurality of inverted lists can further map normalized representations of terms to documents within the collection of electronic documents. The first plurality of inverted lists can further map normalized representations of each term to its variants. The parsed (query-) terms can be substrings (prefixes or suffixes) of words (as opposed to the entire word).

In another aspect, a search query of a collection of electronic documents is split into words and separators. If the number of words and separators are greater than 1, then a suffix search is executed in the terms positional inverted index and a prefix search is conducted (which can be executed in parallel to the suffix search) to each retrieve responsive inverted lists. Thereafter, positional inverted lists are retrieved for each part in between (if any) and all of the inverted lists are combined after taking into consideration term/separator positions. Provision of data characterizing these results can then be initiated. If there is only a single search term or separator then inverted lists are retrieved (rather than performing the suffix and prefix searching.

In a further aspect, a search query of a collection of electronic documents is parsed to identify one or more terms (if any) and one or more term separators (if any). Thereafter, at least one terms inverted list is retrieved from a terms positional inverted index that corresponds to at least one identified term (if present). The terms positional inverted index comprises a first plurality of inverted lists mapping exact representations of terms to documents and associated document positions within the collection of electronic documents. In addition, at least one first separators inverted list corresponding to at least one identified separator (if present) is retrieved from a first separators positional inverted index. The first separators positional inverted index comprises a second plurality of inverted lists mapping term separators to documents and associated document positions within the collection of electronic documents. The first separators positional inverted index is separate from the terms positional inverted index. In addition, at least one second separators inverted list corresponding to at least one identified separator (if present) is retrieved from a second separators positional inverted index. The second separators positional inverted index comprises a third plurality of inverted lists mapping term separators to documents and associated document positions within the collection of electronic documents. The second separators positional inverted index is separate from the terms positional inverted index and the first separators positional inverted index. The first and second separators positional inverted indexes are disjoint. Documents comment to each of the retrieved at least one terms inverted list (if retrieved), the retrieved at least one first separators inverted list (if retrieved), and the at least one second separators inverted list (if retrieved) can be identified so that provision of data characterizing the identified documents can be initiated.

In some implementations, there can be more than one separator inverted index and such inverted indexes can be pairwise disjoint. For example, one separator inverted index can be directed solely to punctuation while another separator inverted index can be directed to spacing (e.g., spaces, tabs, line-breaks). Such an arrangement can provide faster searches for queries containing words and punctuation only.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, for computer-implemented methods the recited operations can be implemented by one or more data processors (which may be part of a single computing system or distributed amongst different computing systems).

The subject matter described herein provides many advantages. For example, the current subject matter enables fast string searching with fast word-based searching while at the same time avoiding memory intensive data redundancy.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
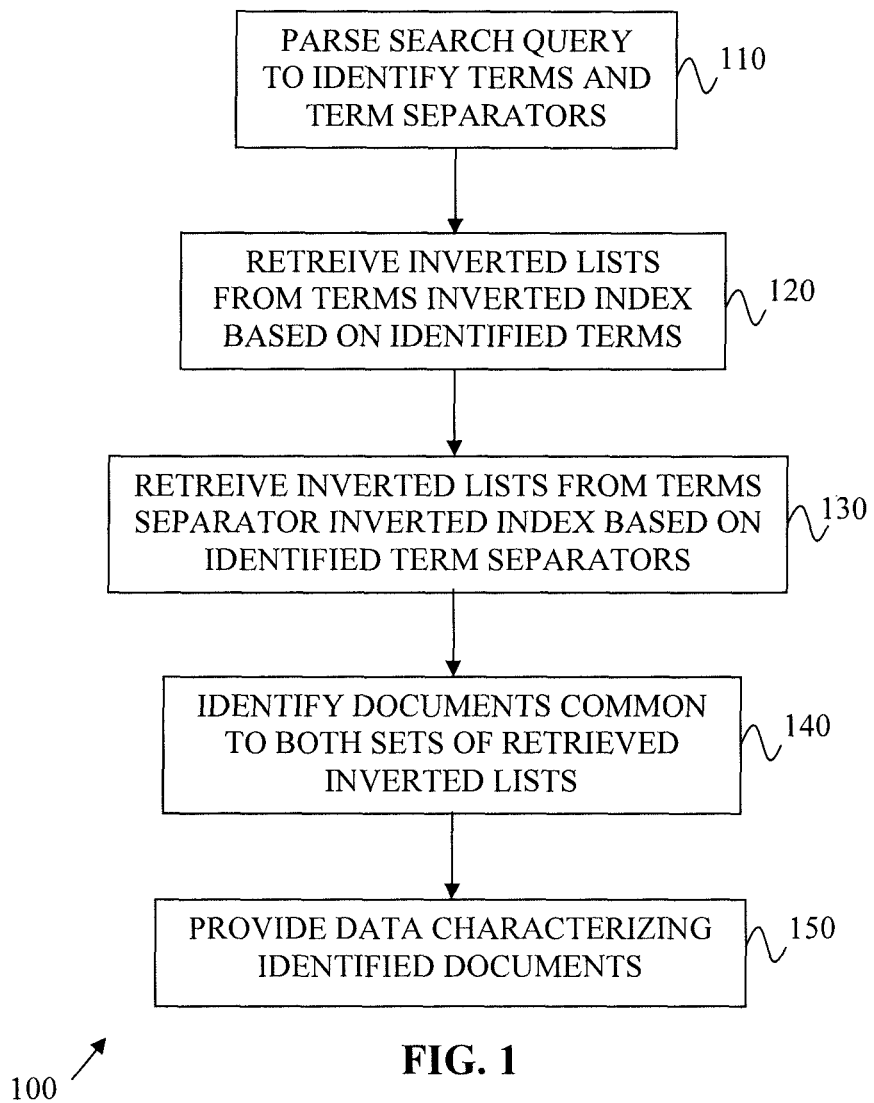
FIG. 1 is a process flow diagram illustrating retrieval of documents using first and second inverted indexes.

FIG. 1 is a process flow diagram 100 illustrating a method in which, at 110, a search query of a collection of electronic documents is parsed to identify one or more terms and/or one or more term separators. Thereafter, at 120, at least one terms inverted list corresponding to at least one identified term (if present in the query) is retrieved from a terms positional inverted index. The terms positional inverted index comprises a first plurality of inverted lists mapping exact representations of terms to documents and associated document positions within the collection of electronic documents. In addition, at 130, at least one separators inverted list corresponding to at least one identified separator is retrieved (if present in the query) from a separators positional inverted index. The separators positional index comprises a second plurality of inverted lists mapping term separators to documents and associated document positions within the collection of electronic documents. The separators position inverted index is separate and distinct from the terms positional inverted index. Subsequently, at 140, documents common to the retrieved at least one terms inverted list (if retrieved) and to the retrieved at least one separators inverted list (if retrieved) are identified. Provision of data characterizing the identified documents can, at 150, then be initiated.

Figure 2:
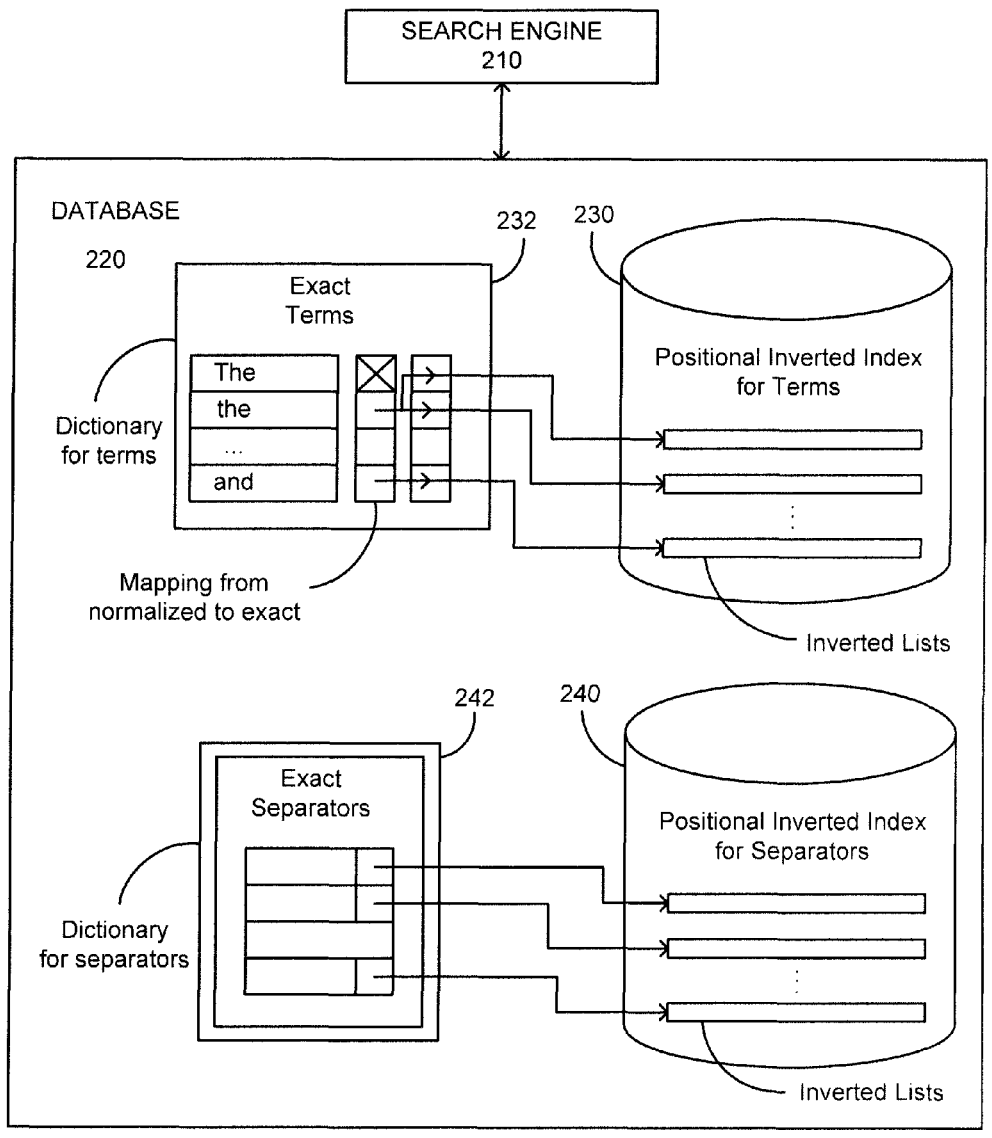
FIG. 2 is a diagram illustrating a search engine and a database having first and second inverted indexes.

FIG. 2 is a diagram 200 illustrating a search engine 210 which can poll a database 220 for documents responsive to a query. While the search engine 210 is illustrated as a separate module, the search engine 210 can include one or more or all of the components included in FIG. 2. The database 220 includes a first inverted index 230 and a second inverted index 240 both of which are used to identify documents stored within the database that are responsive to a query. The first inverted index 230 comprises a positional inverted index for terms and a corresponding first plurality of inverted lists 232 which map terms to documents within the database 220 and additionally identifies positions of such terms within the documents. The second inverted index 240 comprises a terms positional inverted index for terms separators and a corresponding second plurality of inverted lists 232 that map term separators to documents within the database 220 and additionally identifies positions of such term separators within the documents.

The inverted lists 232, 242 can be organized and configured in various manners to facilitate efficient searching of the inverted indexes 230, 240. For example, a long inverted list can be supplemented with a short list of pointers to places in the long list to avoid having to read the entire long list up to a given point of interest. The short list of pointers can be optimized depending on a variety of factors including systems resources, types of indexed documents, and the like.

The term database as used herein refers to a collection of one or more documents which in this context means a set of electronic data (both electronic data stored in a file and electric data received over a network). A document does not necessarily correspond to a file. A document can be stored in a portion of a file that holds other documents, in a single file dedicated to the document in question, or in a set of coordinated files. The documents may be text documents and/or other types of electronic documents including audio, video, picture ADOBE FLASH media files, and other forms of media. For example, a video file may have an associated description (e.g., the description may form part of the metadata/attributes of the video file, etc.) that may be indexed and the video may be presented to the user as a search result.

The search engine 210 when evaluating a query traverses the first plurality of inverted lists 232 for each index term included in the query as well as the second plurality of inverted lists 242 for each term separator included in the query (the sequence of such traversals can be reversed or performed in parallel). For example, evaluating a query formed using Boolean logic may require traversing more than one inverted list depending on the operator, such as OR (the union of inverted lists), AND (an intersection of inverted lists), and the like, or a proximity operator (an intersection of inverted lists), as well as separators as described below. Evaluating a phrase query can be achieved by combining the inverted lists for the query terms to identify matching documents. Positional information of both the terms and the term separators can be used to further filter matching documents.

The first inverted index 230 is a word-based positional inverted index that contains a dictionary of terms built on exact terms rather than on normalized terms (as well as positional information of the terms within the associated documents). Stated differently, variations such as capitalization and the like are taken into account by the corresponding first plurality of inverted lists 232. In addition, the first inverted index 230 can also store a (1:n)-mapping from each normalized term to its variants. With the latter arrangement, the same dictionary as well as the same inverted lists can be used for traditional text search (e.g., searching for normalized terms, etc.). In other words, by building the union of the lists of all variants, the inverted list is similar to a conventional inverted index.

The second inverted index 240, in contrast to the first inverted index 230, is a positional inverted index that indexes character sequences that are skipped while terms are extracted for the first inverted index 230 (as well as positional information of such character sequences within the associated documents). As used herein, these character sequences are referred to a "term separators" and can include designations other than words/terms such as punctuation elements including spaces, commas, exclamation points, colons, semi-colons, and periods.

As the amount of data stored in the dictionaries of the inverted indexes is very small as compared to the raw string data stored in the database 220 and fast pattern search (using, for example, suffix arrays, etc.) can be performed on the entries in the first and second plurality of lists 232, 242 that are unique. The following provides various techniques which can be implemented using the first and second inverted indexes 230, 240.

Word-based searching. With a word-based searching approach, inverted lists 232 from the first inverted index 230 of all exact variants of the normalized query terms are retrieved using normalized-to-exact mapping. Thereafter, the matching inverted lists 232 are combined for each term and data characterizing such documents corresponding to the combination can be provided (e.g., displayed, transmitted, persisted, etc.). In some implementations, optimizations/relevancy determinations can be applied to the documents responsive to the query. In addition, operators can also be applied between the combined matching inverted lists 232 of the different terms (e.g., AND, OR, etc.).

String search: With a string search approach, the query string is first split/parsed into interleaved sequences of words and term separators. Thereafter, a phrase search (i.e., a search specifying the exact terms/term separators and their relative positions) is conducted on the first inverted index 230 and the second inverted index 240 (the query must cover the complete cell in both cases). The results from both of the inverted indexes 230, 240 are then merged to identify common hits which are then mapped to associated documents. Data characterizing such documents can be then be provided (e.g., displayed, transmitted, persisted, etc.).

Figure 3:
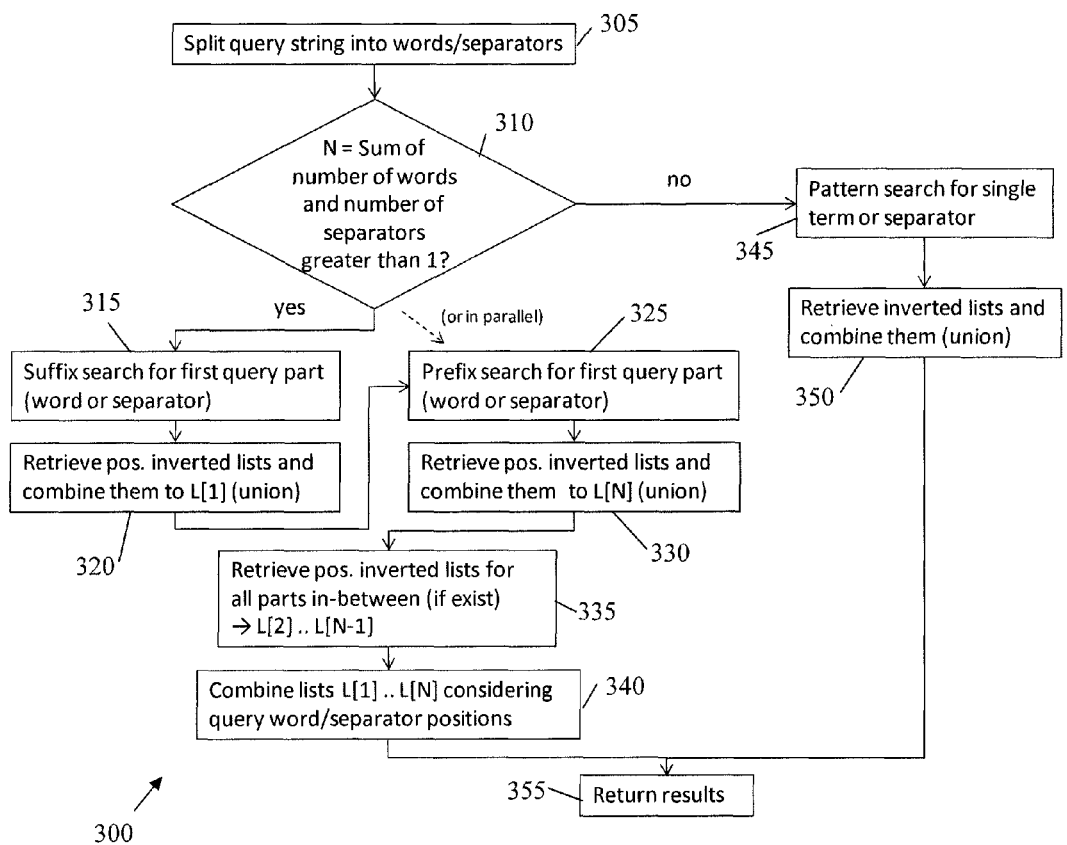
FIG. 3 is a diagram illustrating sub-string searching execution.

Substring search: With a substring approach, and with reference to the diagram 300 of FIG. 3, the query string, at 305, is split/parsed into interleaved sequences of words and term separators. It is then determined, at 310, whether there is more than one word or term separator. If that is the case, at 315, a suffix search is then executed for the first query part and, additionally, at 325, a prefix search is executed for the last query part—both within the exact terms of inverted lists 232 to result in respective inverted lists 320, 330. Thereafter, at 335, positional inverted lists are then retrieved for any word parts in between the prefix and suffix (if any). All of the retrieved positional inverted lists are combined, at 340, considering word/term separator positions and later, at 355, results can be provided. If, at 310, it is determined that there is only one word or term separator then, at 345, a pattern search is retrieved for such word or term separator, and at 350, the responsive inverted lists are retrieved and combined. The results, at 355, can then be provided.

Text-reconstruction. With a text reconstruction approach, techniques such as those described in U.S. patent application Ser. No. 12/056,856 entitled: "Compressed Storage of Documents using Inverted Indexes" (the contents of which are hereby fully incorporated by reference) can be utilized. Namely, word sequences and term separator sequences can be both used to reconstruct the corresponding documents in the respective inverted indexes 230, 240. Thereafter, the word and term separator sequences can be interleaved. By having the exact terms/separators and corresponding position in the index, it is possible to reconstruct the term/separator sequence for each document. In the above-referenced patent application, such reconstruction is accelerating using a "bag-of-words", that is, in addition to the indexes, the database 220 stores, for each document, the IDs of all terms occurring in the document. The term sequences can be generated using the position inverted index and there is a difference between the term sequence and the indexed document. This difference can be stored explicitly according to the above-referenced patent application; however, with the current techniques, there is no need to store the differences because exact terms are stored and there is an index over the separator (with corresponding "bags-of-separators").

In some cases, especially when queries will likely include only words and punctuation, there can be more than one separator inverted index and such inverted indexes can be pairwise disjoint (i.e., they can relate to different term separators, etc.). For example, one separator inverted index can be directed solely to punctuation while another separator inverted index can be directed to spacing (e.g., spaces, tabs, line-breaks). In such a case, the inverted lists, if any, responsive to the query can be retrieved from each inverted index in order to identify responsive documents containing all of the query terms.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer implemented method comprising:
parsing a search query of a collection of electronic documents to identify one or more terms and/or one or more term separators;
splitting the query into interleaved sequences of words and term separators;
retrieving, from a terms positional inverted index, at least one terms inverted list corresponding to at least one identified term if identified in the search query, the terms positional inverted index comprising a first plurality of inverted lists mapping exact representations of terms to documents and associated document positions within the collection of electronic documents;
retrieving, from a separators positional inverted index, at least one separators inverted list corresponding to at least one identified separator if identified in the search query, the separators positional inverted index comprising a second plurality of inverted lists mapping term separators to documents and associated document positions within the collection of electronic documents, the separators positional inverted index being separate from the terms positional inverted index;
identifying documents from the retrieved at least one terms inverted list and/or to the retrieved at least one separators inverted list responsive to the search query; and
initiating provision of data characterizing the identified documents;
wherein:
retrieving from the terms positional inverted index comprises performing a phrase search on the terms positional inverted index; and
retrieving from the separators positional inverted index comprises performing a phrase search on the separators positional inverted index.

2. A method as in claim 1, wherein the initiating comprises: transmitting at least a portion of the data characterizing the identified documents, wherein the data identifies a location of the identified documents.

3. A method as in claim 1, wherein the initiating comprises: persisting at least a portion of the data characterizing the identified documents.

4. A method as in claim 1, wherein the initiating comprises: displaying at least a portion of the data characterizing the identified documents.

5. A method as in claim 1, wherein the term separators are selected from a group comprising: periods, spaces, tabs, line-breaks, commas, colons, semi-colons and exclamation points.

6. A method as in claim 1, wherein the first plurality of inverted lists further map normalized representations of terms to documents within the collection of electronic documents.

7. A method as in claim 6, wherein the first plurality of inverted lists further map normalized representations of each term to its variants.

8. A method as in claim 1, wherein the parsed terms comprise substrings of words.

9. An article of manufacture comprising:
computer executable instructions non-transitorily stored on computer readable media, which, when executed by a computer, causes the computer to perform operations comprising:
parsing a search query of a collection of electronic documents to identify one or more terms and one or more term separators;
splitting the query into interleaved sequences of words and term separators;
retrieving, from a terms positional inverted index, at least one terms inverted list corresponding to at least one identified term, the terms positional inverted index comprising a first plurality of inverted lists mapping exact representations of terms to documents and associated document positions within the collection of electronic documents;
retrieving, from a separators positional inverted index, at least one separators inverted list corresponding to at least one identified separator, the separators positional inverted index comprising a second plurality of inverted lists mapping term separators to documents and associated document positions within the collection of electronic documents, the separators positional inverted index being separate from the terms positional inverted index;
identifying documents common to the retrieved at least one terms inverted list and to the retrieved at least one separators inverted list; and
initiating provision of data characterizing the identified documents;
wherein:
retrieving from the terms positional inverted index comprises performing a phrase search on the terms positional inverted index; and
retrieving from the separators positional inverted index comprises performing a phrase search on the separators positional inverted index.

10. An article as in claim 9, wherein the initiating comprises:
transmitting at least a portion of the data characterizing the identified documents, wherein the data identifies a location of the identified documents.

11. An article as in claim 9, wherein the initiating comprises: persisting at least a portion of the data characterizing the identified documents.

12. An article as in claim 9, wherein the initiating comprises: displaying at least a portion of the data characterizing the identified documents.

13. An article as in claim 9, wherein the term separators are selected from a group comprising: periods, spaces, tabs, line-breaks, commas, colons, semi-colons and exclamation points.

14. An article as in claim 9, wherein the first plurality of inverted lists further map normalized representations of terms to documents within the collection of electronic documents.

15. An article as in claim 14, wherein the first plurality of inverted lists further map normalized representations of each term to its variants.

16. An article as in claim 9, wherein the parsed terms comprise substrings of words.

17. A method comprising:
parsing a search query of a collection of electronic documents to identify one or more terms and one or more term separators;
retrieving, from a terms positional inverted index, at least one terms inverted list corresponding to at least one identified term, the terms positional inverted index comprising a first plurality of inverted lists mapping exact representations of terms to documents and associated document positions within the collection of electronic documents;
retrieving, from a first separators positional inverted index, at least one first separators inverted list corresponding to at least one identified separator, the first separators positional inverted index comprising a second plurality of inverted lists mapping term separators to documents and associated document positions within the collection of electronic documents, the first separators positional inverted index being separate from the terms positional inverted index;

retrieving, from a second separators positional inverted index, at least one second separators inverted list corresponding to at least one identified separator, the second separators positional inverted index comprising a third plurality of inverted lists mapping term separators to documents and associated document positions within the collection of electronic documents, the second separators positional inverted index being separate from the terms positional inverted index and the first separators positional inverted index, the first and second separators positional inverted indexes being disjoint;

identifying documents common to each of the retrieved at least one terms inverted list, the retrieved at least one first separators inverted list, and the at least one second separators inverted list; and initiating provision of data characterizing the identified documents;

wherein:

retrieving from the terms positional inverted index comprises performing a phrase search on the terms positional inverted index; and retrieving from the separators positional inverted index comprises performing a phrase search on the separators positional inverted index.

18. A method as in claim 17, wherein the provision of data comprises one or more of: transmitting at least a portion of the data, transmitting at least a portion of the data, and displaying at least a portion of the data.

* * * * *